US011807313B2

(12) United States Patent
Moreillon et al.

(10) Patent No.: US 11,807,313 B2
(45) Date of Patent: Nov. 7, 2023

(54) VEHICLE STEERING DEVICE

(71) Applicant: JTEKT CORPORATION, Osaka (JP)

(72) Inventors: Maxime Moreillon, Nara (JP);
Tsutomu Tamura, Nara (JP); Robert Fuchs, Nara (JP); Tomohiro Nakade, Sakurai (JP)

(73) Assignee: JTEKT CORPORATION, Osaka (JP)

( * ) Notice: Subject to any disclaimer, the term of this patent is extended or adjusted under 35 U.S.C. 154(b) by 309 days.

(21) Appl. No.: 16/767,852

(22) PCT Filed: Nov. 28, 2018

(86) PCT No.: PCT/JP2018/043841
§ 371 (c)(1),
(2) Date: May 28, 2020

(87) PCT Pub. No.: WO2019/107437
PCT Pub. Date: Jun. 6, 2019

(65) Prior Publication Data
US 2020/0290668 A1    Sep. 17, 2020

(30) Foreign Application Priority Data

Nov. 30, 2017  (JP) ................................. 2017-230561

(51) Int. Cl.
*B62D 5/04* (2006.01)
*B62D 6/00* (2006.01)
*B62D 3/12* (2006.01)

(52) U.S. Cl.
CPC ......... *B62D 5/0463* (2013.01); *B62D 5/0421* (2013.01); *B62D 6/002* (2013.01);
(Continued)

(58) Field of Classification Search
CPC .... B62D 5/0463; B62D 5/0421; B62D 6/002; B62D 6/005; B62D 3/12; B62D 5/0454; B62D 15/025; B62D 6/007
(Continued)

(56) References Cited

U.S. PATENT DOCUMENTS 9,592,848 B1    3/2017 Hirate et al.
2015/0191200 A1    7/2015 Tsubaki et al.
(Continued)

FOREIGN PATENT DOCUMENTS

CN        1712296 A    12/2005
CN      102574542 A    7/2012
(Continued)

OTHER PUBLICATIONS

Feb. 12, 2019 Search Report issued in International Patent Application No. PCT/JP2018/043841.
(Continued)

*Primary Examiner* — Scott A Reinbold
(74) *Attorney, Agent, or Firm* — Oliff PLC

(57) ABSTRACT

A vehicle steering device includes a first setting portion 41 that sets a target assist torque in accordance with a steering torque, a second setting portion 42 that sets an angle controlling target torque for bringing an angular deviation between a target steering angle and an actual steering angle close to zero, an estimator that estimates a compensation object 43 load with respect to the angle controlling target torque, a first calculating portion 44 that calculates a target automatic steering torque based on the angle controlling target torque set by the second setting portion and the compensation object load estimated by the estimator, and a second calculating portion 44 that performs weighted addition of the target automatic steering torque and the target assist torque in accordance with a value that changes in
(Continued)

accordance with a driver input to calculate a target motor torque that is a target value of a motor torque of the electric motor.

7 Claims, 9 Drawing Sheets

(52) U.S. Cl.
CPC .............. *B62D 6/005* (2013.01); *B62D 3/12* (2013.01); *B62D 5/0454* (2013.01)

(58) Field of Classification Search
USPC .......................................... 180/444
See application file for complete search history.

(56) References Cited

U.S. PATENT DOCUMENTS

| | | |
|---|---|---|
| 2015/0344066 A1 | 12/2015 | Tsubaki et al. |
| 2016/0129935 A1* | 5/2016 | Akatsuka ............... B62D 6/002 180/446 |
| 2017/0217477 A1 | 8/2017 | Akatsuka et al. |
| 2017/0297614 A1 | 10/2017 | Minaki et al. |
| 2021/0061344 A1* | 3/2021 | Kitazume .............. B62D 1/286 |

FOREIGN PATENT DOCUMENTS

| | | |
|---|---|---|
| CN | 103228524 A | 7/2013 |
| CN | 104661898 A | 5/2015 |
| CN | 106428193 A | 2/2017 |
| CN | 107215387 A | 9/2017 |
| JP | 2004-256076 A | 9/2004 |
| JP | 2014-54885 A | 3/2014 |
| JP | 2015-33942 A | 2/2015 |
| JP | 2017-7663 A | 1/2017 |
| WO | 2014/122997 A1 | 8/2014 |
| WO | 2014/136515 A1 | 9/2014 |
| WO | 2017/164105 A1 | 9/2017 |

OTHER PUBLICATIONS

Jul. 7, 2021 Extended Search Report issued in European Patent Application No. 18882690.3.
Jul. 8, 2021 Extended Search Report issued in European Patent Application No. 18883279.4.
Mar. 2, 2022 Office Action issued in Chinese Patent Application No. 201880077131.6.
Feb. 15, 2022 Office Action issued in Chinese Patent Application No. 201880077034.7.
Mar. 17, 2022 Ofice Action issued in U.S. Appl. No. 16/767,834.

* cited by examiner

VEHICLE STEERING DEVICE

TECHNICAL FIELD

The present invention relates to a vehicle steering device that is able to realize automatic steering control of controlling a steering angle automatically and manual steering control (assist control) of controlling the steering angle manually using the same electric motor.

BACKGROUND ART

A vehicle steering device that is able to realize automatic steering control of controlling a steering angle automatically and manual steering control using the same actuator (electric motor) is disclosed in Patent Literature 1 mentioned below. With the invention described in Patent Literature 1, the steering torque to be applied to a steering shaft by an actuator (hereinafter referred to as the target actuator torque $T_t$) is expressed by the following formula (a).

$$T_t = K_{asst} \cdot T_{asst} + K_{auto} \cdot T_{auto} \quad (a)$$

In the formula (a), $T_{asst}$ is a target assist torque, $T_{auto}$ is a target steering torque for performing automatic steering control (referred to as hereinafter as the target automatic steering torque), and $K_{asst}$ and $K_{auto}$ are respectively weighting factors. The actuator is controlled such as to generate a torque matching the target actuator torque $T_t$.

During the manual steering control, $K_{auto}$ is set to zero and therefore, $T_t = K_{asst} \cdot T_{asst}$. Also, during the manual steering control, the factor $K_{asst}$ is set to 1 and therefore, $T_t = T_{asst}$. During the automatic steering control, the target actuator torque $T_t$ is calculated based on the formula (a). During the automatic steering control, as long as a steering operation by a driver is not applied, the steering torque would be zero at times besides start and end of the automatic steering control and therefore the target assist torque $T_{asst}$ would be zero. Also, during the automatic steering control, the factor $K_{auto}$ is set to 1 and therefore, $T_t = T_{auto}$.

With the invention described in Patent Literature 1, when a steering intervention is detected during the automatic steering control, transition control for transitioning from the automatic steering control to the manual steering control is started. In the transition control, each time a predetermined time elapses, the value of $K_{auto}$ is decreased by a predetermined amount $K_1$ and the value of $K_{asst}$ is increased by a predetermined value $K_2$. However, when the value of $K_{auto}$ falls below 0, $K_{auto}$ is fixed at 0 and when the value of $K_{asst}$ surpasses 1, $K_{asst}$ is fixed at 1. The target actuator torque $T_t$ is then calculated using the renewed $K_{auto}$ and $K_{asst}$ and the actuator is controlled such that the torque matching the calculated target actuator torque $T_t$ is generated from the actuator. When the value of $K_{auto}$ thus becomes 0 and the value of $K_{asst}$ becomes 1, the transition control ends.

CITATION LIST

Patent Literature

Patent Literature 1: Japanese Patent Application Publication No. 2004-256076

SUMMARY OF INVENTION

Technical Problem

With the transition control described in Patent Literature 1, the value of $K_{auto}$ gradually decreases with time and the value of $K_{asst}$ gradually increases with time. Then, when the value of $K_{auto}$ becomes 0 and the value of $K_{asst}$ becomes 1, the transition control ends. It is thereby possible to suppress fluctuation of the target actuator torque $T_t$ in the process of releasing the automatic steering control and it is thus possible to reduce a sense of incongruity that the driver feels. However, with the invention described in Patent Literature 1, time from start to end of the transition control (transition control time) is always constant and therefore, it is not possible to change the transition control time by the steering operation by the driver. It thus may not be possible to perform switching from the automatic steering control to the manual steering control rapidly, for example, in an emergency.

An object of the present invention is to provide a vehicle steering device with which performing of automatic steering control and manual steering control using the same electric motor is enabled by a novel method and it is possible to adjust degrees of automatic steering and manual steering smoothly.

Solution to Problem

A vehicle steering device according to a preferred embodiment of the present invention includes an electric motor that applies a steering force to a turning mechanism of a vehicle, a first setting portion that sets a target assist torque in accordance with a steering torque, a second setting portion that sets an angle controlling target torque for bringing an angular deviation between a target steering angle and an actual steering angle close to zero, an estimator that estimates a compensation object load with respect to the angle controlling target torque, a first calculating portion that calculates a target automatic steering torque based on the angle controlling target torque set by the second setting portion and the compensation object load estimated by the estimator, and a second calculating portion that performs weighted addition of the target automatic steering torque and the target assist torque in accordance with a value that changes in accordance with a driver input to calculate a target motor torque that is a target value of a motor torque of the electric motor.

According to the present arrangement, a vehicle steering device is provided with which performing of automatic steering control and manual steering control using the same electric motor is enabled by a novel method. Also, according to the present arrangement, a vehicle steering device with which it is possible to perform switching from the automatic steering control to the manual steering control or vice versa seamlessly and rapidly while changing weighting amounts of the respective controls is provided.

In the preferred embodiment of the present invention, the compensation object load includes a road surface load torque that a drive object of the electric motor receives from a road surface.

In the preferred embodiment of the present invention, a torsion bar is included in middle of a torque transmission path between a steering member and the turning mechanism and the compensation object load includes a friction torque that is generated in a torque transmission path from the torsion bar to a turned wheel.

In the preferred embodiment of the present invention, the value that changes in accordance with the driver input used in the second calculating portion is the angular deviation or the steering torque.

In the preferred embodiment of the present invention, the value that changes in accordance with the driver input used in the second calculating portion is the angular deviation, the second calculating portion is arranged to calculate the target motor torque by adding a value resulting from multiplying the target automatic steering torque by a first weighting factor and a value resulting from multiplying the target assist torque by a second weighting factor, the first weighting factor is set such as to become 0 when an absolute value of the angular deviation is more than a predetermined value and to decrease gradually from 1 to 0 as the absolute value of the angular deviation increases from 0 when the absolute value of the angular deviation is not more than the predetermined value, and the second weighting factor is set such as to become 1 when the absolute value of the angular deviation is more than the predetermined value and to increase gradually from 0 to 1 as the absolute value of the angular deviation increases from 0 when the absolute value of the angular deviation is not more than the predetermined value.

In the preferred embodiment of the present invention, the second setting portion includes a feedback control torque calculating portion that performs a predetermined feedback calculation on the angular deviation to calculate the feedback control torque, a feedforward control torque calculating portion that multiplies a second order derivative of the target steering angle by a moment of inertia of the vehicle steering device to calculate a feedforward control torque, and an adder that adds the feedforward control torque to the feedback control torque to calculate the angle controlling target torque.

In the preferred embodiment of the present invention, the first calculating portion includes a restriction processing portion that restricts the angle controlling target torque set by the second setting portion to be between a predetermined upper limit value and a predetermined lower limit value and a calculating portion that calculates the target automatic steering torque based on the angle controlling target torque after a restriction process by the restriction portion and the compensation object load estimated by the estimator.

The aforementioned as well as yet other objects, features, and effects of the present invention will be made clear by the following description of the preferred embodiments made with reference to the accompanying drawings.

DESCRIPTION OF EMBODIMENTS

Figure 1:
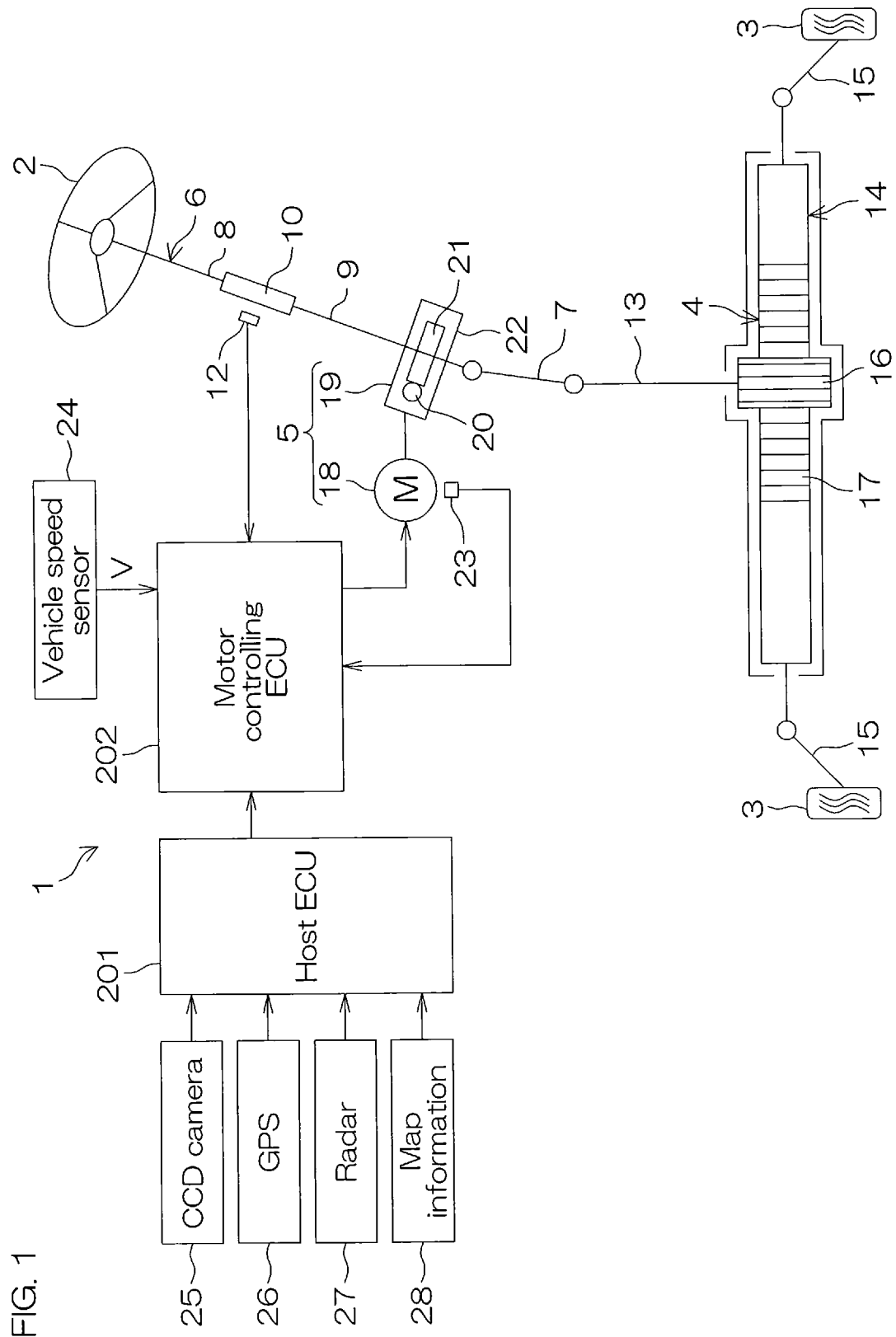
FIG. 1 is a schematic view of the general arrangement of an electric power steering device that is a preferred embodiment of a vehicle steering device according to the present invention.

FIG. 1 is a schematic view of the general arrangement of an electric power steering device that is a preferred embodiment of a vehicle steering device according to the present invention.

The present electric power steering system (EPS) 1 is a column type EPS with which an electric motor and a speed reducer are disposed at a column portion.

The electric power steering system 1 includes a steering wheel (handle) 2 as a steering member arranged to steer a vehicle, a turning mechanism 4 that turns turned wheels 3 in linkage with rotation of the steering wheel 2, and a steering assisting mechanism 5 arranged to assist steering by a driver. The steering wheel 2 and the turning mechanism 4 are mechanically coupled via a steering shaft 6 and an intermediate shaft 7.

The steering shaft 6 includes an input shaft 8 coupled to the steering wheel 2 and an output shaft 9 coupled to the intermediate shaft 7. The input shaft 8 and the output shaft 9 are relatively rotatably coupled via a torsion bar 10.

A torque sensor 12 is provided in a vicinity of the torsion bar 10. The torque sensor 12 detects a steering torque (torsion bar torque) $T_d$ applied to the steering wheel 2, based on a relative rotational displacement amount of the input shaft 8 and the output shaft 9. In the present preferred embodiment, the steering torque $T_d$ detected by the torque sensor 12 is deemed to be such that, for example, a torque for steering in a left direction is detected as a positive value, a torque for steering in a right direction is detected as a negative value, and the greater its absolute value, the greater the magnitude of the steering torque $T_d$.

The turning mechanism 4 is constituted of a rack and pinion mechanism that includes a pinion shaft 13 and a rack shaft 14 as a turning shaft. The turned wheels 3 are coupled via tie rods 15 and knuckle arms (not shown) to respective end portions of the rack shaft 14. The pinion shaft 13 is coupled to the intermediate shaft 7. The pinion shaft 13 is arranged to pivot in linkage with steering of the steering wheel 2. A pinion 16 is coupled to a tip of the pinion shaft 13.

The rack shaft 14 extends rectilinearly along a right/left direction of the vehicle. A rack 17 engaged with the pinion 16 is formed at an intermediate portion in an axial direction of the rack shaft 14. By the pinion 16 and the rack 17, rotation of the pinion shaft 13 is converted to axial direction movement of the rack shaft 14. By moving the rack shaft 14 in the axial direction, it is possible to turn the turned wheels 3.

When the steering wheel 2 is steered (rotated), the rotation is transmitted to the pinion shaft 13 via the steering shaft 6 and the intermediate shaft 7. The rotation of the pinion shaft 13 is then converted to the axial direction movement of the rack shaft 14 by the pinion 16 and the rack 17. The turned wheels 3 are thereby turned.

The steering assisting mechanism 5 includes an electric motor 18 arranged to generate a steering assisting force (assist torque) and a speed reducer 19 arranged to amplify and transmit an output torque of the electric motor 18 to the turning mechanism 4. The speed reducer 19 is constituted of a worm gear mechanism that includes a worm gear 20 and a worm wheel 21 engaged with the worm gear 20. The speed reducer 19 is housed inside a gear housing 22 as a transmission mechanism housing. In the following description, a speed reduction ratio (gear ratio) of the speed reducer 19 is represented at times by N. The speed reduction ratio N is defined as a ratio $\omega w_g/\omega_{ww}$ of an angular speed $\omega w_g$ of the worm gear 20 with respect to an angular speed $\omega_{ww}$ of the worm wheel 21.

The worm gear 20 is driven to rotate by the electric motor 18. Also, the worm wheel 21 is integrally rotatably coupled to the output shaft 9.

When the worm gear 20 is driven to rotate by the electric motor 18, the worm wheel 21 is driven to rotate, a motor torque is applied to the steering shaft 6, and the steering shaft 6 (output shaft 9) rotates. The rotation of the steering shaft 6 is then transmitted to the pinion shaft 13 via the intermediate shaft 7. The rotation of the pinion shaft 13 is then converted to the axial direction movement of the rack shaft 14. The turned wheels 3 are thereby turned. That is, steering assistance by the electric motor 18 and turning of the turned wheels 3 are made possible by the worm gear 20 being driven to rotate by the electric motor 18. The electric motor 18 is provided with a rotation angle sensor 23 arranged to detect a rotation angle of a rotor of the electric motor 18.

As torques applied to the output shaft 9 (an example of a driven object of the electric motor 18) there are the motor torque applied by the electric motor 18 and a disturbance torque besides the motor torque. The steering torque $T_d$, a road surface load torque (road surface reaction torque) $T_{rl}$, a friction torque $T_f$, etc., are included in the disturbance torque $T_{lc}$ besides the motor torque.

The steering torque $T_d$ is a torque applied to the output shaft 9 from the steering wheel 2 side by a force applied to the steering wheel 2 by the driver and an inertial force of the steering wheel 2.

The road surface load torque $T_{rl}$ is a torque applied to the output shaft 9 from a road surface side and via the turned wheels 3 and the rack shaft 14 by a self-aligning torque generated at tires, forces generated by a suspension and by tire wheel alignment, etc.

The friction torque $T_f$ is a torque applied to the output shaft 9 by friction generated in a torque transmission path from the torsion bar 10 to the tires. The friction torque $T_f$ includes torques applied to the output shaft 9 by friction between the worm wheel 21 and the worm gear 20 and friction in the rack and pinion mechanism.

In the present preferred embodiment, a torque obtained by subtracting the steering torque $T_d$ or a steering torque $T_{d'}$ compensated for influence of the inertial force of the steering wheel 2 from the disturbance torque $T_{lc}$ besides the motor torque becomes a load (compensation object load) $T_{le}$ to be compensated with respect to an angle controlling target torque $T_{m,ac}$ calculated by an angle controller 42 to be described below (see FIG. 2). Therefore, in the present preferred embodiment, the compensation object load $T_{le}$ includes the road surface load torque (road surface reaction torque) $T_{rl}$ and the friction torque $T_f$. In the following description, a value ($T_{le}/N$) obtained by dividing the compensation object load $T_{le}$ by the speed reduction ratio N of the speed reducer 19 shall be represented by $T_{lem}$.

The vehicle is installed with a vehicle speed sensor 24 arranged to detect a vehicle speed V, a CCD (charge coupled device) camera 25 that takes an image of a road in front in a travel direction of the vehicle, a GPS (global positioning system) 26 arranged to detect an own vehicle position, a radar 27 arranged to detect road shape and obstacles, and a map information memory 28 that stores map information.

The CCD camera 25, the GPS 26, the radar 27, and the map information memory 28 are connected to a host ECU (electronic control unit) 201 arranged to perform automatic support control and automatic operation control. Based on information obtained by the CCD camera 25, the GPS 26, and the radar 27 and on the map information, the host ECU 201 performs peripheral environment recognition, own vehicle position estimation, route planning, etc., and determines control target values for steering and driving actuators.

In the present preferred embodiment, the host ECU 201 sets a target steering angle $\theta_{cmda}$ for automatic steering. In the present preferred embodiment, automatic steering control is control, for example, for making the vehicle travel along a target track. The target steering angle $\theta_{cmda}$ is a target value of a steering angle for making the vehicle perform automatic travel along the target track. A process for setting such a target steering angle $\theta_{cmda}$ is well known and therefore a detailed description is omitted here. With the present preferred embodiment, a rotation angle of the output shaft 9 shall be deemed to be the "steering angle."

The target steering angle $\theta_{cmda}$ set by the host ECU 201 is provided via an onboard network to a motor controlling ECU 202. The steering torque $T_d$ detected by the torque sensor 12, an output signal of the rotation angle sensor 23, and the vehicle speed V detected by the vehicle speed sensor 24 are input into the motor controlling ECU 202. The motor controlling ECU 202 controls the electric motor 18 based on these input signals and information provided from the host ECU 201.

Figure 2:
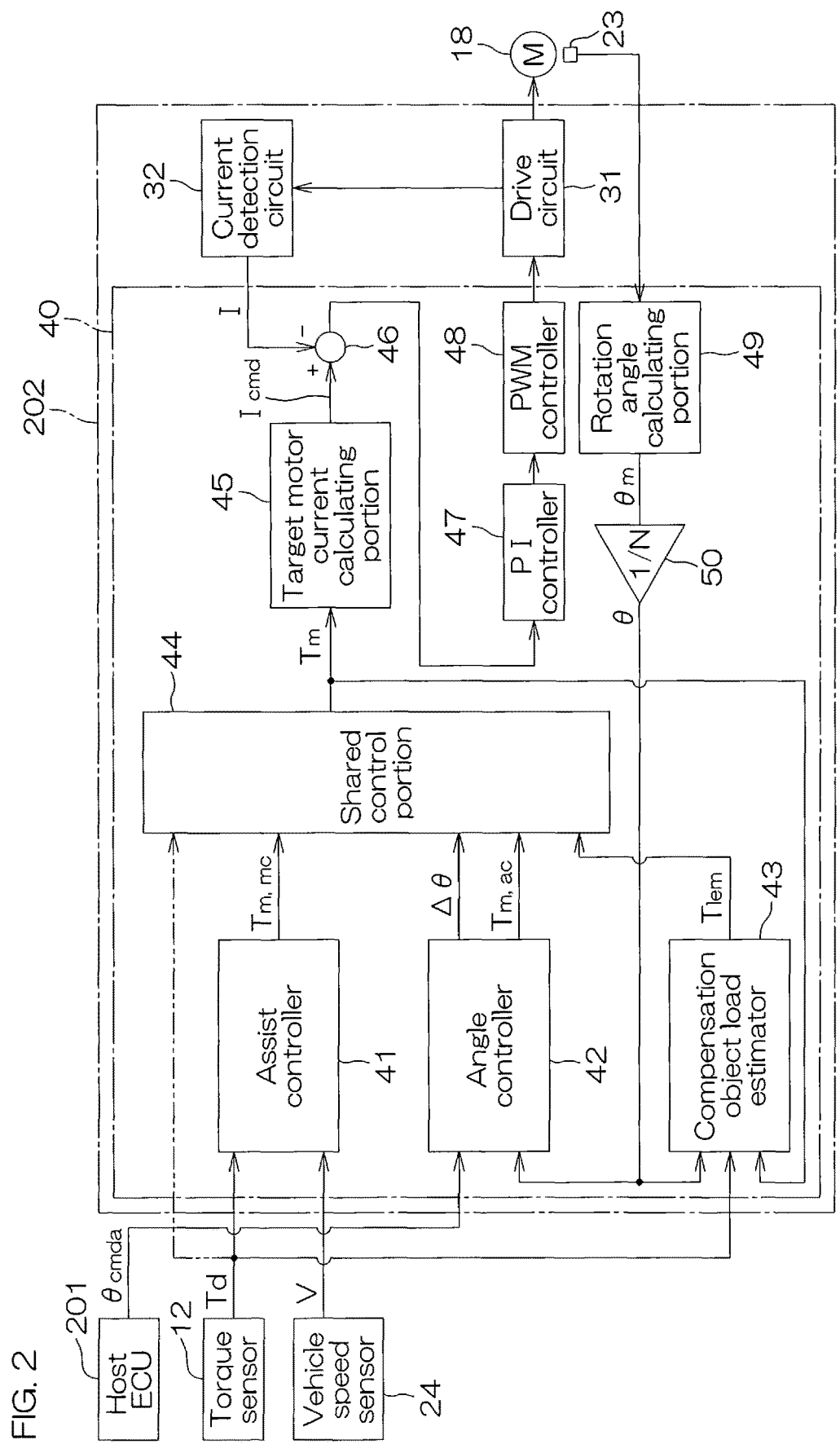
FIG. 2 is a block diagram for describing the electrical configuration of a motor controlling ECU.

FIG. 2 is a block diagram for describing the electrical configuration of the motor controlling ECU 202.

The motor controlling ECU 202 includes a microcomputer 40, a drive circuit (inverter circuit) 31 controlled by the microcomputer 40 and supplying power to the electric motor 18, and a current detection circuit 32 arranged to detect a current flowing through the electric motor 18 (hereinafter referred to as the "motor current I").

The microcomputer 40 includes a CPU and a memory (a ROM, a RAM, a nonvolatile memory, etc.) and is arranged to function as a plurality of function processing portions by execution of a predetermined program. The plurality of function processing portions include an assist controller (assist map) 41, the angle controller 42, a compensation object load estimator 43, a shared control portion (shared control) 44, a target motor current calculating portion 45, a current deviation calculating portion 46, a PI controller 47, a PWM (pulse width modulation) controller 48, a rotation angle calculating portion 49, and a speed reduction ratio divider 50.

The assist controller 41 is an example of a first setting portion of the present invention. The angle controller 42 is an example of a second setting portion of the present invention. The shared control portion 44 is an example of a first calculating portion and a second calculating portion of the present invention.

The rotation angle calculating portion 49 calculates a rotor rotation angle $\theta_m$ of the electric motor 18 based on the output signal of the rotation angle sensor 23. The speed reduction ratio divider 50 divides the rotor rotation angle $\theta_m$ calculated by the rotation angle calculating portion 49 by the speed reduction ratio N to convert the rotor rotation angle $\theta_m$ to the rotation angle (actual steering angle) $\theta$ of the output shaft 9.

Figure 3:
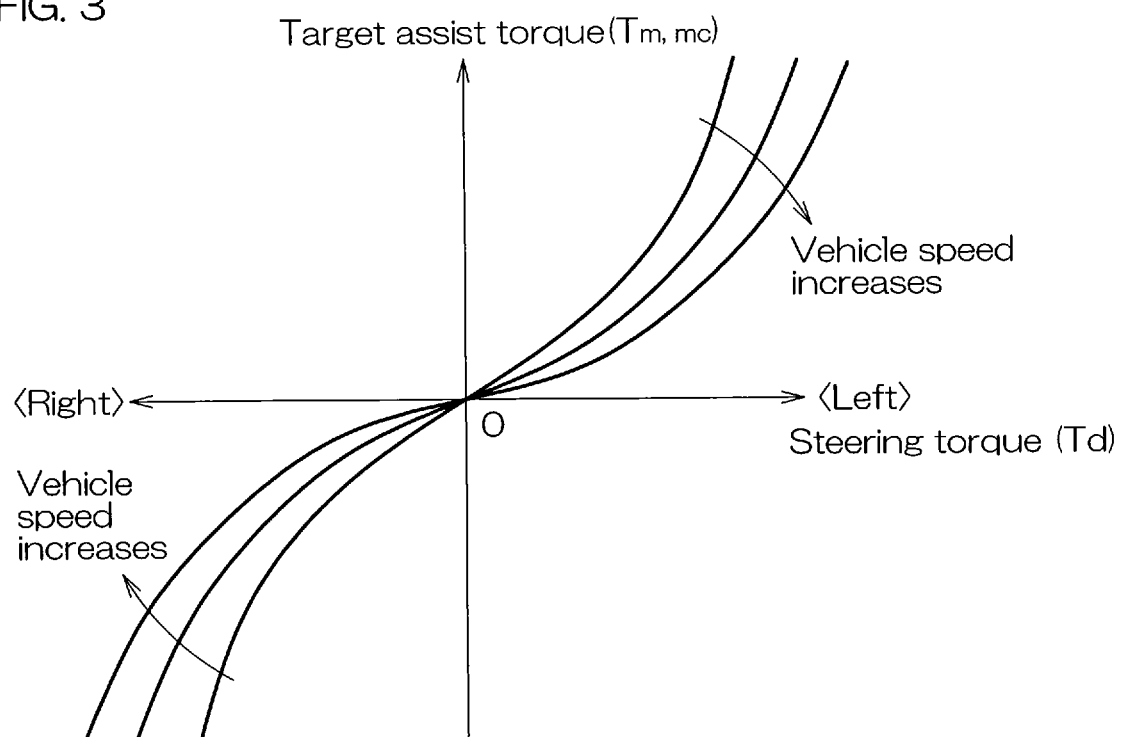
FIG. 3 is a graph of setting examples of a target assist torque $T_{m,mc}$ with respect to a steering torque $T_d$.

The assist controller 41 sets a target assist torque $T_{m,mc}$ that is a target value of an assist torque necessary for manual operation. The assist controller 41 sets the target assist torque $T_{m,mc}$ based on the steering torque $T_d$ detected by the torque sensor 12 and the vehicle speed V detected by the vehicle speed sensor 24. Setting examples of the target assist torque $T_{m,mc}$ with respect to the steering torque $T_d$ are shown in FIG. 3.

With respect to a positive value of the steering torque $T_d$, the target assist torque $T_{m,mc}$ takes on a positive value and makes a steering assisting force for left direction steering be generated from the electric motor 18. Also, with respect to a negative value of the steering torque $T_d$, the target assist torque $T_{m,mc}$ takes on a negative value and makes a steering assisting force for right direction steering be generated from the electric motor 18. Also, the target assist torque $T_{m,mc}$ is set such that its absolute value increases as the absolute value of the steering torque $T_d$ increases. Also, the target assist torque $T_{m,mc}$ is set such that its absolute value decreases as the vehicle speed V detected by the vehicle speed sensor 24 increases.

The angle controller 42 sets the angle controlling target torque $T_{m,ac}$ necessary for angle control (steering angle control) based on the target steering angle $\theta_{cmda}$ provided from the host ECU 201 and the actual steering angle $\theta$ calculated by the speed reduction ratio divider 50. Details of the angle controller 42 shall be described later.

The compensation object load estimator 43 estimates the compensation object load $T_{lem}$ based on the steering torque $T_d$ detected by the torque sensor 12, the actual steering angle $\theta$ calculated by the speed reduction ratio divider 50, and a target motor torque $T_m$ set by the shared control portion 44. As shall be described later, a target automatic steering torque $T_{m,ad}$ that is a target value of the motor torque necessary for automatic steering (see FIG. 8) is calculated based on the angle controlling target torque $T_{m,ac}$ set by the angle controller 42 and the compensation object load $T_{lem}$ estimated by the compensation object load estimator 43. Details of the compensation object load estimator 43 shall be described later.

The target assist torque $T_{m,mc}$ set by the assist controller 41, the angle controlling target torque $T_{m,ac}$ set by the angle controller 42, an angular deviation $\Delta\theta$ calculated by the angle controller 42 (see FIG. 4), and the compensation object load $T_{lem}$ estimated by the compensation object load estimator 43 are input into the shared control portion 44. Based on these inputs, the shared control portion 44 calculates the target motor torque $T_m$. Details of the shared control portion 44 shall be described later.

The target motor current calculating portion 45 calculates a target motor current $I_{cmd}$ by dividing the target motor torque $T_m$ calculated by the shared control portion 44 by a torque constant $K_t$ of the electric motor 18.

The current deviation calculating portion 46 calculates a deviation $\Delta I(=I_{cmd}-I)$ between the target motor current $I_{cmd}$ obtained by the target motor current calculating portion 45 and the motor current I detected by the current detection circuit 32.

The PI controller 47 performs PI calculation (proportional integral calculation) on the current deviation $\Delta I$ calculated by the current deviation calculating portion 46 to generate a drive command value for bringing the motor current I flowing through the electric motor 18 close to the target motor current $I_{cmd}$. The PWM controller 48 generates a PWM control signal with a duty ratio corresponding to the drive command value and supplies the signal to the drive circuit 31. Power corresponding to the drive command value is thereby arranged to be supplied to the electric motor 18.

The angle controller 42, the compensation object load estimator 43, and the shared control portion 44 shall now be described in detail.

Figure 4:
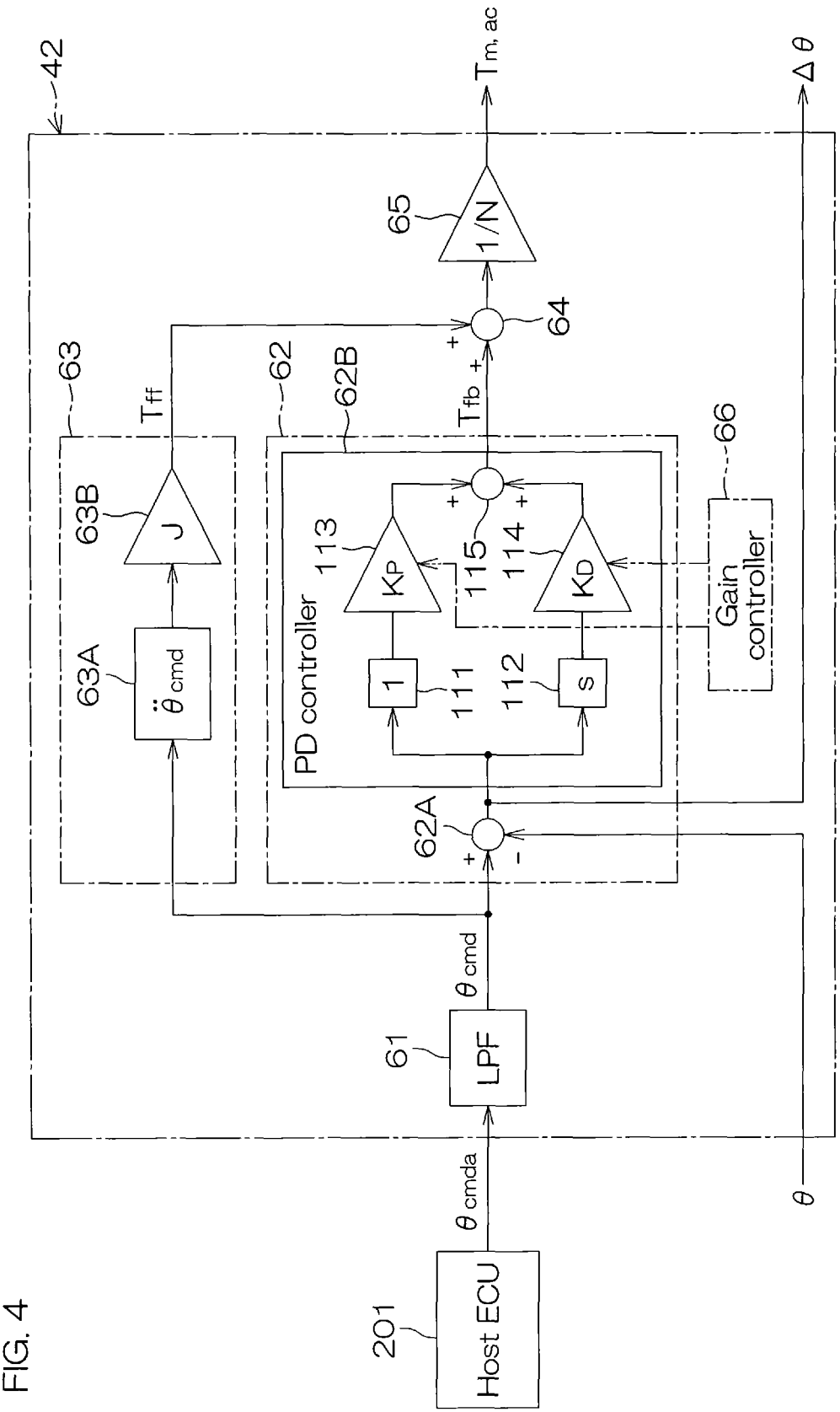
FIG. 4 is a block diagram of the arrangement of an angle controller.

FIG. 4 is a block diagram of the arrangement of the angle controller 42.

The angle controller 42 includes a low-pass filter (LPF) 61, a feedback controller 62, a feedforward controller 63, a torque adder 64, and a speed reduction ratio divider 65.

The low-pass filter 61 performs a low-pass filter process on the target steering angle $\theta_{cmda}$ provided from the host ECU 201. The target steering angle $\theta_{cmd}$ after the low-pass filter process is provided to the feedback controller 62 and the feedforward controller 63.

The feedback controller 62 is provided to bring the actual steering angle $\theta$ calculated by the speed reduction ratio divider 50 (see FIG. 2) close to the target steering angle $\theta_{cmd}$. The feedback controller 62 includes an angular deviation calculating portion 62A and a PD controller 62B. The angular deviation calculating portion 62A calculates a deviation $\Delta\theta(=\theta_{cmd}-\theta)$ between the target steering angle $\theta_{cmd}$ and the actual steering angle $\theta$ calculated by the speed reduction ratio divider 50. The angular deviation $\Delta\theta$ calculated by the angular deviation calculating portion 62A is provided to the PD controller 62B and also provided to the shared control portion 44.

The PD controller 62B calculates a feedback control torque $T_{fb}$ by performing PD calculation (proportional differential calculation) on the angular deviation $\Delta\theta$ calculated by the angular deviation calculating portion 62A. Specifically, the PD controller 62B includes a proportional processing portion 111, a differential processing portion 112, a proportional gain multiplier 113, a differential gain multiplier 114, and an adder 115.

The proportional gain multiplier 113 multiplies the angular deviation $\Delta\theta$ proportionally processed by the proportional processing portion 111 by a proportional gain $K_P$. The differential gain multiplier 114 multiplies the angular deviation $\Delta\theta$ differentially processed by the differential processing portion 112 by a differential gain $K_D$. The adder 115 adds the respective multiplication results of the proportional gain multiplier 113 and the differential gain multiplier 114 to calculate the feedback control torque $T_{fb}$. The feedback control torque $T_{fb}$ is provided to the torque adder 64.

The feedforward controller 63 is provided to improve responsiveness of control by compensating for a delay in responsiveness of the electric power steering system 1 due to inertia. The feedforward controller 63 includes an angular acceleration calculating portion 63A and an inertia multiplier 63B. The angular acceleration calculating portion 63A performs second order differentiation of the target steering angle $\theta_{cmd}$ to calculate a target angular acceleration $d^2\theta_{cmd}/dt^2$. The inertia multiplier 63B multiplies the target angular acceleration $d^2\theta_{cmd}/dt^2$ by an inertia J of the electric power steering system 1 to calculate a feedforward torque $T_{ff}$ $(=J\cdot d^2\theta_{cmd}/dt^2)$. The inertia J is determined, for example, from a physical model of the electric power steering system 1. The feedforward torque $T_{ff}$ is provided as an inertial compensation value to the torque adder 64.

The torque adder 64 adds the feedforward torque $T_{ff}$ to the feedback control torque $T_{fb}$ to calculate an angle controlling target steering torque $(T_{fb}+T_{ff})$. The angle controlling target steering torque compensated for inertia (target torque for the output shaft 9) is thereby obtained. It is thereby possible to perform highly precise motor control (steering angle control).

The angle controlling target steering torque $(T_{fb}+T_{ff})$ is provided to the speed reduction ratio divider 65. The speed reduction ratio divider 65 divides the angle controlling target steering torque ($T_{fb}+T_{ff}$) by the speed reduction ratio N to calculate the angle controlling target torque $T_{m,ac}$ (target torque for the electric motor 18). The angle controlling target torque $T_{m,ac}$ is provided to the shared control portion 44 (see FIG. 2).

Figure 5:
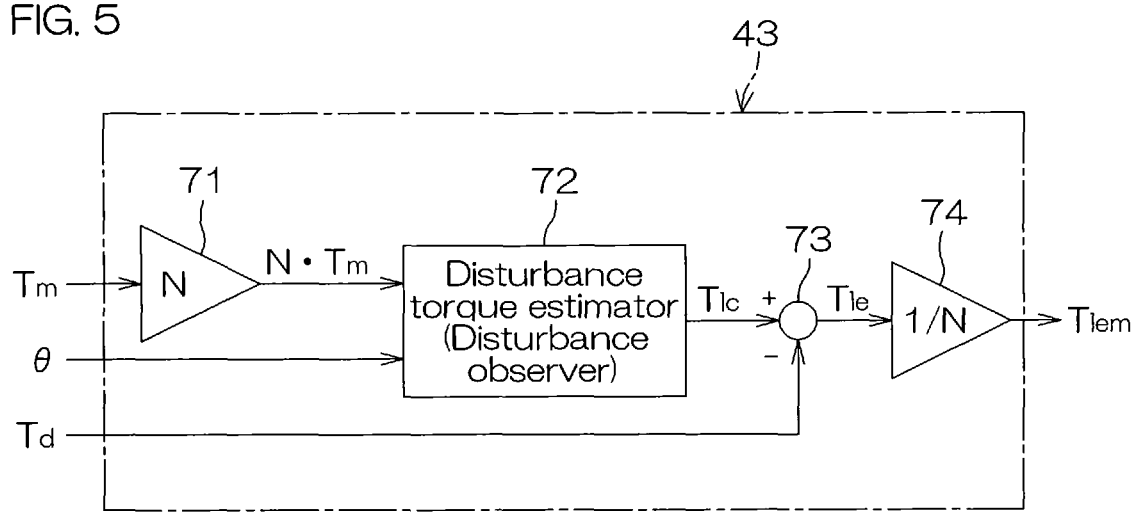
FIG. 5 is a block diagram of the arrangement of a compensation object load estimator.

FIG. 5 is a block diagram of the arrangement of the compensation object load estimator 43.

The compensation object load estimator 43 includes a speed reduction ratio multiplier 71, a disturbance torque estimator (disturbance observer) 72, a subtractor 73, and a speed reduction ratio divider 74.

The speed reduction ratio multiplier 71 multiplies the target motor torque $T_m$ set by the shared control portion 44 by the speed reduction ratio N to convert the target motor torque $T_m$ to a target steering torque $N \cdot T_m$ that acts on the output shaft 9.

The disturbance torque estimator 72 estimates a nonlinear torque that is generated as a disturbance in a plant (control object (motor drive object)) (the disturbance torque: the torque besides the motor torque). The disturbance torque estimator 72 estimates the disturbance torque (disturbance load) $T_{lc}$, the steering angle θ, and a steering angle derivative (angular speed) dθ/dt based on the target steering torque $N \cdot T_m$ that is a target value of the plant and the actual steering angle θ that is an output of the plant. In the following description, the estimates of the disturbance torque $T_{lc}$, the steering angle θ, and the steering angle derivative (angular speed) dθ/dt is represented at times by $\hat{T}_{lc}$, $\hat{\theta}$, and $\hat{d\theta/dt}$, respectively.

The subtractor 73 subtracts the steering torque $T_d$ detected by the torque sensor 12 from the disturbance torque $T_{lc}$ estimated by the disturbance torque estimator 72 to calculate the compensation object load $T_{le}(=T_{lc}-T_d)$ to be applied to the output shaft 9 (speed reducer 19). The speed reduction ratio divider 74 divides the compensation object load $T_{le}$ calculated by the subtractor 73 by the speed reduction ratio N to calculate the compensation object load $T_{lem}$ to be applied to the motor shaft of the electric motor 18 via the speed reducer 19. The compensation object load $T_{lem}$ calculated by the speed reduction ratio divider 74 is provided to the shared control portion 44.

The disturbance torque estimator 72 shall now be described in detail. The disturbance torque estimator 72 is arranged from a disturbance observer that estimates the disturbance torque $T_{lc}$, the steering angle θ, and the angular speed dθ/dt using, for example, a physical model 101 of the electric power steering system 1 shown in FIG. 6.

The physical model 101 includes a plant (example of the motor drive object) 102 that includes the output shaft 9 and the worm wheel 21 fixed to the output shaft 9. The steering torque $T_d$ is applied to the plant 102 from the steering wheel 2 via the torsion bar 10. Also, to the plant 102, the road surface load torque $T_{rl}$ is applied from the turned wheels 3 side and a portion $T_{f1}$ of the friction torque $T_f$ is applied due to friction in the rack and pinion mechanism, etc. Further, to the plant 102, the target steering torque $N \cdot T_m$ is applied via the worm gear 20 and a portion $T_{f2}$ of the friction torque $T_f$ is applied due to friction between the worm wheel 21 and the worm gear 20, etc. Here, it shall be deemed that $T_f=T_{f1}+T_{f2}$.

If an inertia of the plant 102 is J, an equation of motion regarding the inertia of the physical model 101 is expressed by the following formula (1).

$$J\ddot{\theta} = N \cdot T_m + T_{lc} \tag{1}$$

$$T_{lc} = T_d + T_{rl} + T_f$$

$d^2\theta/dt^2$ is an acceleration of the plant 102. N is the speed reduction ratio of the speed reducer 19. $T_{lc}$ represents the disturbance torque, besides the motor torque, that is applied to the plant 102. In the present preferred embodiment, the disturbance torque $T_{lc}$ is considered to mainly include the steering torque $T_d$, the road surface load torque $T_{rl}$, and the friction torque $T_f$.

Figure 6:
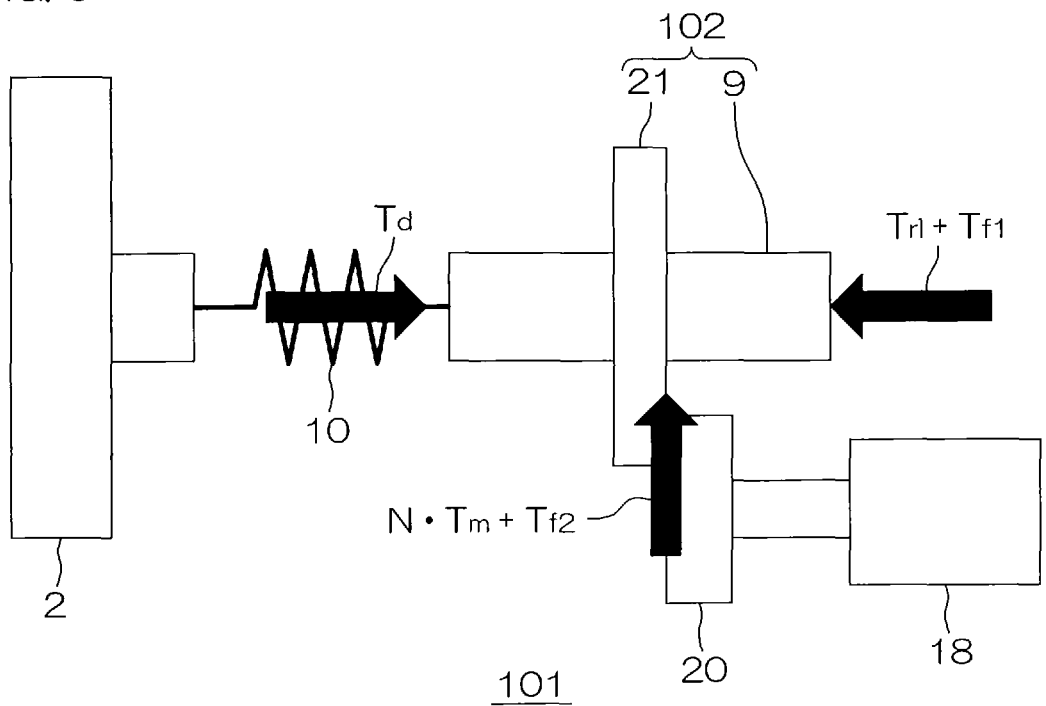
FIG. 6 is a schematic diagram of an arrangement example of a physical model of an electric power steering system.

An equation of state for the physical model 101 of FIG. 6 is expressed, for example, by the following formula (2).

$$\begin{cases} \dot{x} = Ax + B_1 u_1 + B_2 u_2 \\ y = Cx + Du_1 \end{cases} \tag{2}$$

In the formula (2), x is a state variable vector. In the formula (2), $u_1$ is a known input vector. In the formula (2), $u_2$ is an unknown input vector. In the formula (2), y is an output vector (measured value). In the formula (2), A is a system matrix. In the formula (2), $B_1$ is a first input matrix. In the formula (2), $B_2$ is a second input matrix. In the formula (2), C is an output matrix. In the formula (2), D is a feed-through matrix.

The equation of state is extended to a system that includes the unknown input vector $u_1$ as one state. An equation of state of the extended system (extended equation of state) is expressed, for example, by the following formula (3).

$$\begin{cases} \dot{x}_e = A_e x_e + B_e u_1 \\ y = C_e x_e \end{cases} \tag{3}$$

In the formula (3), $x_e$ is a state variable vector of the extended system and is expressed by the following formula (4).

$$x_e = \begin{bmatrix} x \\ u_2 \end{bmatrix} \tag{4}$$

In the formula (3), $A_e$ is a system matrix of the extended system. In the formula (3), $B_e$ is a known input matrix of the extended system. In the formula (3), $C_e$ is an output matrix of the extended system.

From the extended equation of state of the formula (3), a disturbance observer (extended state observer) expressed by the equation of the following formula (5) is constructed.

$$\begin{cases} \dot{\hat{x}}_e = A_e \hat{x}_e + B_e u_1 + L(y - \hat{y}) \\ \hat{y} = C_e \hat{x}_e \end{cases} \tag{5}$$

In the formula (5), $\hat{x}_e$ represents an estimate of $x_e$. Also, L is an observer gain. Also, $\hat{y}$ represents an estimate of y. $\hat{x}_e$ is expressed by the following formula (6).

$$\hat{x}_e = \begin{bmatrix} \hat{\theta} \\ \dot{\hat{\theta}} \\ \hat{T}_{lc} \end{bmatrix} \tag{6}$$

$\hat{\theta}$ is an estimate of θ and $\hat{T}_{lc}$ is an estimate of $T_{lc}$.

The disturbance torque estimator 72 calculates a state variable vector $\hat{x}_e$ based on the equation of the formula (5).

Figure 7:
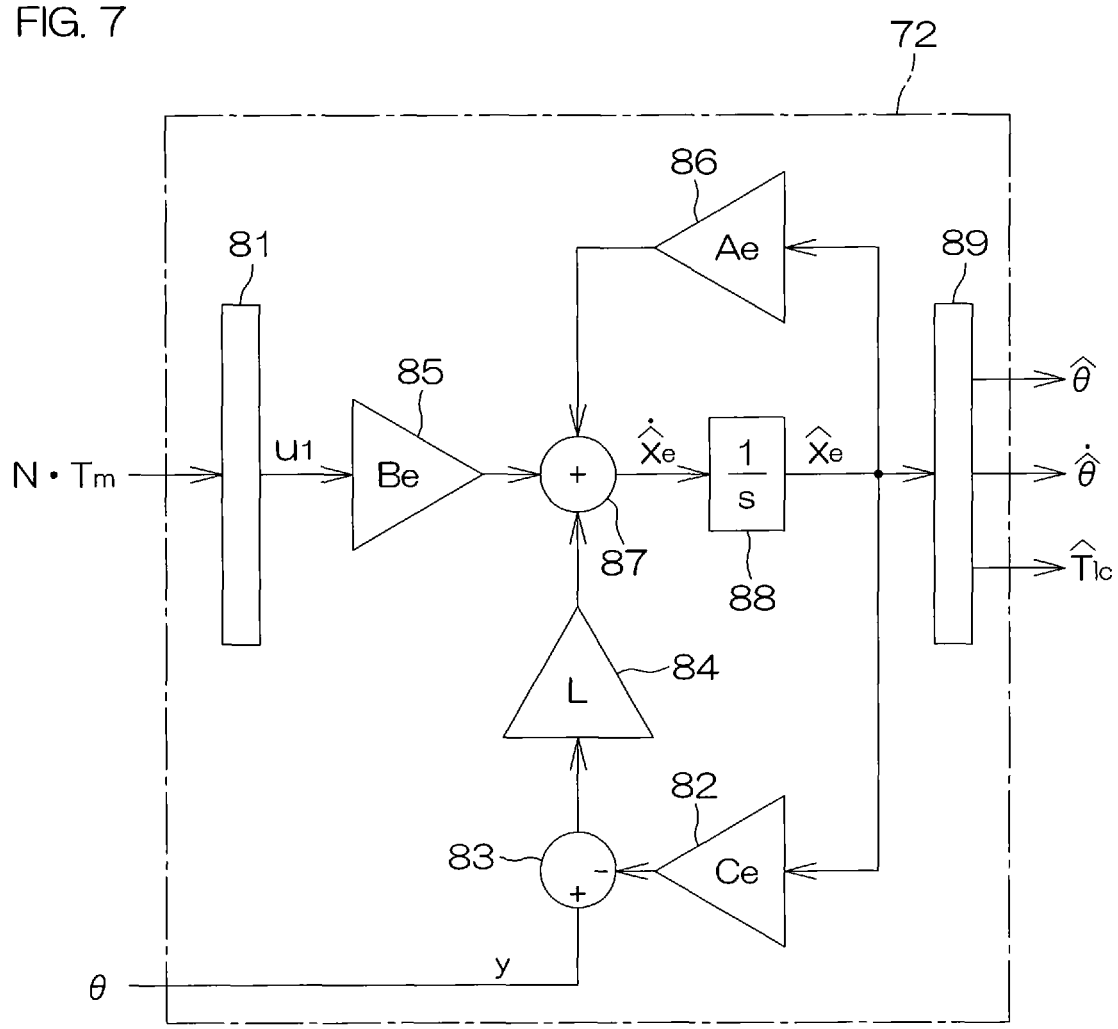
FIG. 7 is a block diagram of the arrangement of a disturbance torque estimator.

FIG. 7 is a block diagram of the arrangement of the disturbance torque estimator 72.

The disturbance torque estimator 72 includes an input vector inputting portion 81, an output matrix multiplier 82, a first adder 83, a gain multiplier 84, an input matrix multiplier 85, a system matrix multiplier 86, a second adder 87, an integrator 88, and a state variable vector outputting portion 89.

The target steering torque $N \cdot T_m$ calculated by the speed reduction ratio multiplier 71 (see FIG. 5) is provided to the input vector inputting portion 81. The input vector inputting portion 81 outputs the input vector $u_1$.

The output of the integrator 88 becomes the state variable vector $\hat{x}_e$ (see formula (6)). At a start of calculation, an initial value is provided as the state variable vector $\hat{x}_e$. The initial value of the state variable vector $\hat{x}_e$ is, for example, 0.

The system matrix multiplier 86 multiplies the state variable vector $\hat{x}_e$ by the system matrix $A_e$. The output matrix multiplier 82 multiplies the state variable vector $\hat{x}_e$ by the output matrix $C_e$.

The first adder 83 subtracts the output of the output matrix multiplier 82 ($C_e \cdot \hat{x}_e$) from the output vector (measured value) y that is the actual steering angle θ calculated by the speed reduction ratio divider 50 (see FIG. 2). That is, the first adder 83 calculates a difference (y−ŷ) between the output vector y and the output vector estimate $\hat{y}(=C_e \cdot \hat{x}_e)$. The gain multiplier 84 multiplies the output of the first adder 83 (y−ŷ) by the observer gain L (seethe formula (5)).

The input matrix multiplier 85 multiplies the input vector $u_1$ output from the input vector inputting portion 81 by the input matrix $B_e$. The second adder 87 adds the output of the input matrix multiplier 85 ($B_e \cdot u_1$), the output of the system matrix multiplier 86 ($A_e \cdot \hat{x}_e$), and the output of the gain multiplier 84 (L(y−ŷ)) to calculate a derivative $d\hat{x}_e/dt$ of the state variable vector. The integrator 88 integrates the output of the second adder 87 ($d\hat{x}_e/dt$) to calculate the state variable vector $\hat{x}_e$. Based on the state variable vector $\hat{x}_e$, the state variable vector outputting portion 89 outputs a disturbance torque estimate $\hat{T}_{lc}$, a steering angle estimate $\hat{\theta}$, and an angular speed estimate $d\hat{\theta}/dt$.

Unlike the extended state observer described above, a general disturbance observer is constituted from an inverse model of the plant and a low-pass filter. The equation of motion of the plant is expressed by the formula (1) as mentioned above. Therefore, an inverse model of the plant is the following formula (7).

$$T_{lc} = J\ddot{\theta} - N \cdot T_m \tag{7}$$

The general disturbance observer has $J \cdot d^2\theta/dt^2$ and $T_m$ as inputs and, due to using the second order derivative of the actual steering angle θ, is greatly influenced by noise of the rotation angle sensor 23. On the other hand, the extended state observer of the preferred embodiment described above is an integral type that estimates the disturbance torque in accordance with the difference (y−ŷ) between the steering angle estimate $\hat{\theta}$ estimated from the motor torque input and the actual steering angle θ and therefore, it is possible to reduce influence of noise due to differentiation.

Figure 8:
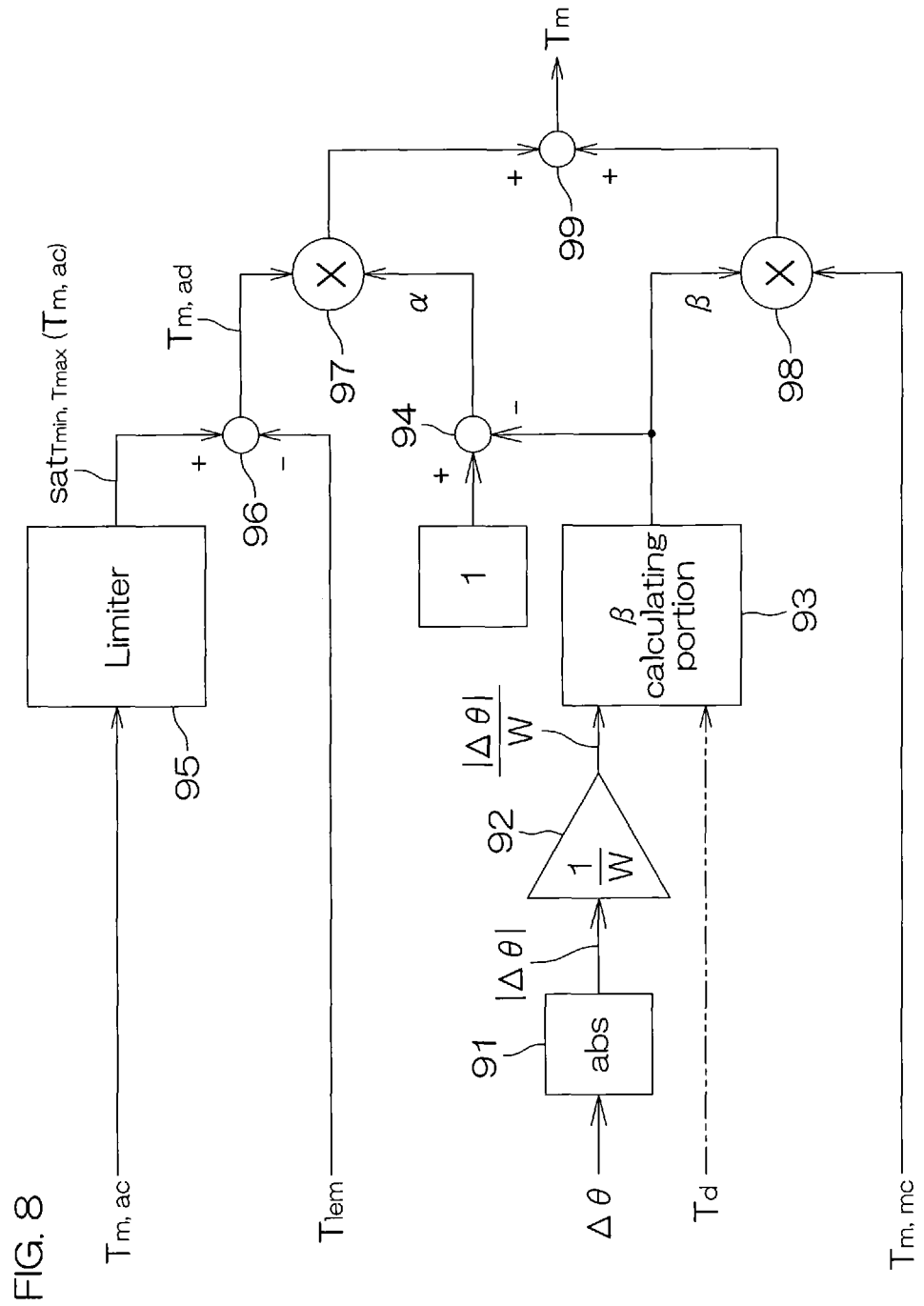
FIG. 8 is a block diagram of the arrangement of a shared control portion.

FIG. 8 is a block diagram of the arrangement of the shared control portion 44.

The shared control portion 44 includes an absolute value calculating portion 91, a divider 92, a β calculating portion 93, an α calculating portion 94, a limiter 95, a subtractor 96, an α multiplier 97, a β multiplier 98, and an adder 99. The limiter 95 is an example of a restriction processing portion of the present invention.

The absolute value calculating portion 91 calculates an absolute value |Δθ| of the angular deviation Δθ. The divider 92 calculates a weight calculating variable |Δθ|/W by dividing the absolute value |Δθ| of the angular deviation Δθ calculated by the absolute value calculating portion 91 by a shared control effective angular deviation width that has been set in advance (hereinafter referred to simply as the "effective angular deviation width W"). Here, W>0.

Then β calculating portion 93 calculates a weighting factor β based on the following formula (8). That is, the β calculating portion 93 uses a saturation function $sat_{0,1}$ (|Δθ|/W) defined by the following formula (8) to calculate the weighting factor β. The saturation function $sat_{0,1}$ (|Δθ|/W) is calculated using the angular deviation Δθ, which is an example of a "value that changes in accordance with a driver input."

$$\beta = sat_{0,1}\left(\frac{|\Delta\theta|}{W}\right) \tag{8}$$

$$sat_{0,1}\left(\frac{|\Delta\theta|}{W}\right) = \begin{cases} 0 & \text{IF } \frac{|\Delta\theta|}{W} < 0 \\ \frac{|\Delta\theta|}{W} & \text{IF } 0 \leq \frac{|\Delta\theta|}{W} \leq 1 \\ 1 & \text{IF } \frac{|\Delta\theta|}{W} > 1 \end{cases}$$

Figure 9:
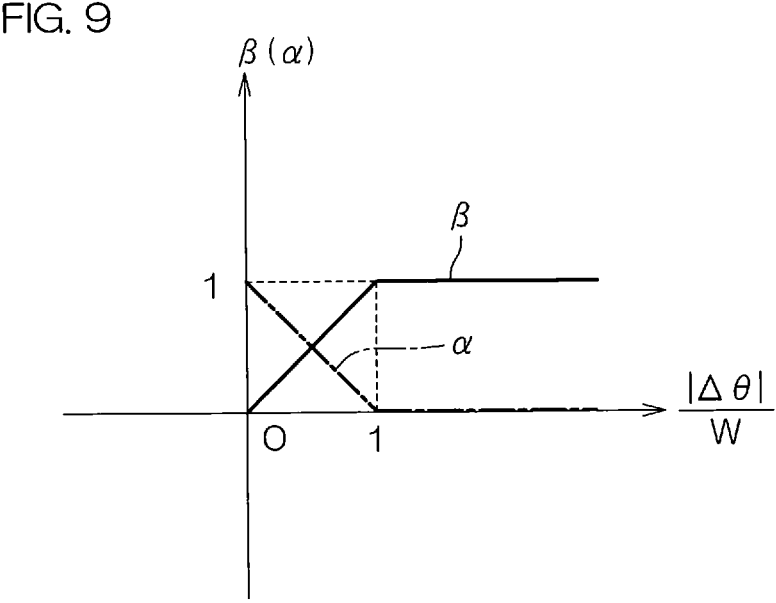
FIG. 9 is an explanatory diagram for describing an operation of a limiter.

That is, as shown by a solid broken line in FIG. 9, the β calculating portion 93 outputs 1 if |Δθ|/W is more than 1. Also, the β calculating portion 93 outputs a calculation result of |Δθ|/W if |Δθ|/W is not less than 0 and not more than 1. The weighting factor β thus takes on a value of not less than 0 and not more than 1.

Thea calculating portion 94 calculates a weighting factor α by subtracting β from 1. That is, as shown by a dot-dash broken line in FIG. 9, the α calculating portion 94 outputs 0 if |Δθ|/W is more than 1. Also, the α calculating portion 94 outputs a calculation result of {1−(|Δθ|/W)} if |Δθ|/W is not less than 0 and not more than 1. The weighting factor α thus takes on a value of not less than 0 and not more than 1.

The limiter 95 restricts the angle controlling target torque $T_{m,ac}$ set by the angle controller 42 to be between a predetermined lower limit saturation value $T_{min}$ ($T_{min}$<0) and upper limit saturation value $T_{max}$ ($T_{max}$>0). In the present preferred embodiment, $T_{min}=-T_{max}$. Specifically, the limiter 75 calculates a restriction-processed angle controlling target torque $sat_{Tmin,Tmax}$ ($T_{m,ac}$) based on the following formula (9).

$$sat_{T_{min},T_{max}}(T_{m,ac}) = \begin{cases} T_{min} & \text{IF } T_{m,mc} < T_{min} \\ T_{m,ac} & \text{IF } T_{min} \leq T_{m,ac} \leq T_{max} \\ T_{max} & \text{IF } T_{m,ac} > T_{max} \end{cases} \tag{9}$$

Figure 10:
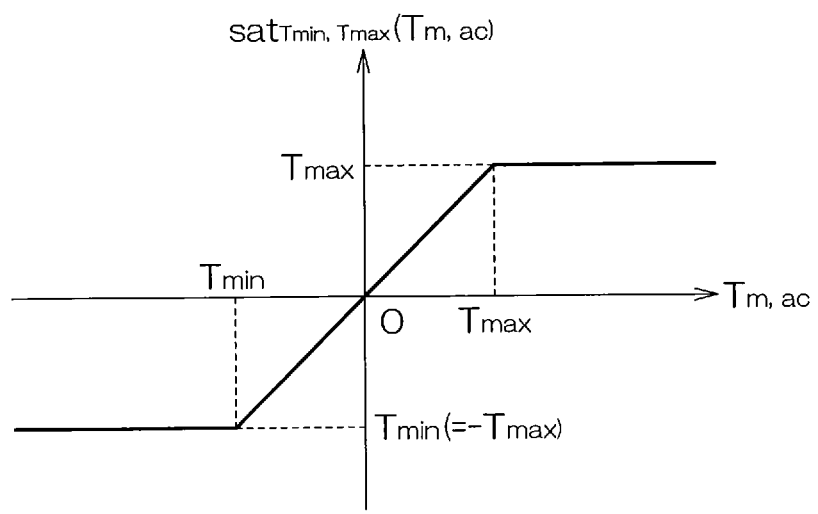
FIG. 10 is an explanatory diagram for describing an operation of a β calculating portion.

As shown in FIG. 10, the limiter 95 outputs the angle controlling target torque $T_{m,ac}$ as it is if the angle controlling target torque $T_{m,ac}$ is of a value not less than the lower limit saturation value $T_{min}$ and not more than the upper limit saturation value $T_{max}$. Also, the limiter 75 outputs the lower limit saturation value $T_{min}$ if the angle controlling target torque $T_{m,ac}$ is less than the lower limit saturation value $T_{min}$. Also, the limiter 75 outputs the upper limit saturation value $T_{max}$ if the angle controlling target torque $T_{m,ac}$ is more than the upper limit saturation value $T_{max}$.

The limiter 95 is provided to enable the driver to release the automatic steering easily during the automatic steering.

Specifically, if the driver performs a steering operation to release the automatic steering (steering intervention) during the automatic steering, the angular deviation $\Delta\theta$ would be large and an absolute value of the angle controlling target torque $T_{m,ac}$ set by the angle controller 42 (see FIG. 2) would be large. The greater the absolute value of the angle controlling target torque $T_{m,ac}$, the greater a steering reaction force during the steering intervention by the driver and therefore, it becomes difficult for the driver to perform the steering intervention. The limiter 95 is thus provided to prevent the absolute value of the angle controlling target torque $T_{m,ac}$ from becoming too large.

The subtractor 96 subtracts the compensation object load $T_{lem}$ estimated by the compensation object load estimator 43 (see FIG. 2) from the angle controlling target torque $\text{sat}_{Tmin,Tmax}(T_{m,ac})$ that has been restriction-processed by the limiter 95 to calculate the target automatic steering torque $T_{m,ad}(=\text{sat}_{Tmin,Tmax}(T_{m,ac})-T_{lem})$. The target automatic steering torque $T_{m,ad}$ compensated for the road surface load torque $T_{rl}$ and the friction torque $T_f$ is thereby obtained.

The $\alpha$ multiplier 97 multiplies the target automatic steering torque $(\text{sat}_{Tmin,Tmax}(T_{m,ac})-T_{lem})$ calculated by the subtractor 96 by the weighting factor $\alpha$ calculated by the a calculating portion 94 to calculate $\alpha \cdot (\text{sat}_{Tmin,Tmax}(T_{m,ac})-T_{lem})$.

The $\beta$ multiplier 98 multiplies the target assist torque $T_{m,mc}$ set by the assist controller 41 (see FIG. 2) by the weighting factor $\beta$ calculated by the $\beta$ calculating portion 93 to calculate $\beta \cdot T_{m,mc}$.

The adder 99 adds $\alpha \cdot \text{sat}_{Tmin,Tmax}(T_{m,ac})-T_{lem}$ calculated by the $\alpha$ multiplier 97 and $\beta \cdot T_{m,mc}$ calculated by the $\beta$ multiplier 98 to calculate the target motor torque $T_m$. The target motor torque $T_m$ is expressed by the following formula (10).

$$T_m = \alpha \cdot (\text{sat}_{Tmin,Tmax}(T_{m,ac})-T_{lem}) + \beta \cdot T_{m,mc} \quad (10)$$

That is, the shared control portion 44 performs weighted addition of the target automatic steering torque $(\text{sat}_{Tmin,Tmax}(T_{m,ac})-T_{lem})$ and the target assist torque $T_{m,mc}$ to calculate the target motor torque $T_m$.

The weighting factor $\beta$ for the target assist torque $T_{m,mc}$ becomes 1 when $(|\Delta\theta|/W)>1$ and becomes $(|\Delta\theta|/W)$ when $0 \leq |\Delta\theta| \leq 1$. On the other hand, the weighting factor $\alpha$ for the target automatic steering torque $(\text{sat}_{Tmin,Tmax}(T_{m,ac})-T_{lem})$ becomes 0 when $|\Delta\theta|/W>1$ and becomes $(1-|\Delta\theta|/W)$ when $0 \leq |\Delta\theta|/W \leq 1$.

Therefore, when $|\Delta\theta|/W>1$, $\beta=1$ and $\alpha=0$ and therefore $T_m=T_{m,mc}$. Steering based on the target assist torque $T_{m,mc}$ is thereby arranged to be performed when the absolute value $|\Delta\theta|$ of the angular deviation $\Delta\theta$ is more than the effective angular deviation width W. Steering by the manual steering is thereby performed.

When $|\Delta\theta|/W$ is zero, $\beta=0$ and $\alpha=1$ and therefore $T_m = (\text{sat}_{Tmin,Tmax}(T_{m,ac})-T_{lem})$. Steering based on the target automatic steering torque $(\text{sat}_{Tmin,Tmax}(T_{m,ac})-T_{lem})$ is thereby arranged to be performed when the angular deviation $\Delta\theta$ is 0.

When $|\Delta\theta|/W$ is within the range of $0 \leq |\Delta\theta|/W \leq 1$, $\beta$ decreases and $\alpha$ increases as $|\Delta\theta|/W$ decreases (as $|\Delta\theta|$ approaches zero). On the other hand, an absolute value of the target automatic steering torque $(\text{sat}_{Tmin,Tmax}(T_{m,ac})-T_{lem})$ decreases as $|\Delta\theta|$ decreases. Also, regardless of the angular deviation $\Delta\theta$, the absolute value of the target assist torque $T_{m,mc}$ increases as the absolute value $|T_d|$ of the steering torque $T_d$ increases.

Therefore, if the driver is not performing a steering operation when $|\Delta\theta|/W$ is within the range of $0 \leq |\Delta|/W \leq 1$, $|T_d|$ and $|\Delta\theta|$ are comparatively small and therefore, steering is mainly performed based on $(\text{sat}_{Tmin,Tmax}(T_{m,ac})-T_{lem})$. Steering by the automatic steering is thereby enabled.

If the driver performs a steering operation (steering intervention) when $|\Delta\theta|/W$ is within the range of $0 \leq |\Delta\theta|/W \leq 1$, $|T_d|$ increases and therefore, steering is mainly performed based on the target assist torque Steering by the manual steering is thereby enabled. Although $|\Delta\theta|$ increases and the absolute value $|T_{m,ac}|$ of the angle controlling target torque $T_{m,ac}$ increases in this process, it is possible to suppress increase of the steering reaction force during the steering intervention by the driver because the limiter 95 restricts the angle controlling target torque $T_{m,ac}$ set by the angle controller 42 and therefore, the driver is enabled to perform the steering intervention easily.

If the driver weakens a degree of the steering intervention while performing the steering intervention when $|\Delta\theta|/W$ is within the range of $0 \leq |\Delta\theta|/W \leq 1$, $|T_d|$ changes from a state of being large to a state of being small and therefore $|\Delta\theta|$ also changes from a state of being large to a state of being small. Thereby, based on the formula (10), the absolute value of the target assist torque $T_{m,mc}$ changes from a state of being large to a state of being small and the target automatic steering torque $(\text{sat}_{Tmin,Tmax}(T_{m,ac})-T_{lem})$ changes from a state of being small to a state of being large in accordance with the degree of the steering intervention.

If the driver strengthens the degree of the steering intervention while performing the steering intervention, the respective changes occur in reverse directions. Switching between a state in which the automatic steering is dominant and a state in which the steering by the driver is dominant is thus enabled to be performed seamlessly and smoothly by the driver simply adjusting the degree of steering intervention and being unaware of a junction of the switching.

With the preferred embodiment described above, a comparatively simple control enables the automatic steering control and manual steering control to be performed using the same electric motor. Also, when the absolute value of the angular deviation $\Delta\theta$ reaches the effective angular deviation width W, the target motor torque $T_m$ becomes equal to the target assist torque $T_{m,mc}$, thus enabling switching from the automatic steering to the manual steering to be performed promptly by a steering operation by the driver.

Although the preferred embodiment of the present invention has been described above, it is possible to implement the present invention in yet other modes. For example, with the preferred embodiment described above, the $\beta$ calculating portion 93 (see FIG. 8) calculates the weighting factor $\beta$ using the saturation function $\text{sat}_{0,1}(|\Delta\theta|/W)$. However, the $\beta$ calculating portion 93 may calculate the weighting factor $\beta$ using the steering torque $T_d$ instead.

Specifically, the $\beta$ calculating portion 93 may perform calculation based on a saturation function $\text{sat}_{0,1}(P)$ shown in the following formula (11). The saturation function $\text{sat}_{0,1}(P)$ is calculated using the steering torque $T_d$, which is an example of the "value that changes in accordance with the driver input." In this case, the steering torque $T_d$ detected by the torque sensor 12 is input into the shared control portion 44 as indicated by alternate long and two short dashed lines in FIG. 2 and FIG. 8.

$$\beta = \text{sat}_{0,1}(P)$$

$$P = k1 \times \int\int |T_d| dt^2 + \int k_2 dt \quad (11)$$

$k_1$: factor for adjusting sensitivity of transfer of authority with respect to driver input $k_2$ ($k_2$<0): factor for adjusting degree of decreasing P $$sat_{0,1}(P) = \begin{cases} 1 & \text{IF } P > 1 \\ P & \text{IF } 0 \leq P \leq 1 \\ 0 & \text{IF } P < 0 \end{cases}$$

In a steering wheel released state ($T_d$=0), P decreases. In a steering wheel gripped state, P increases when the absolute value $|T_d|$ of the steering torque increases.

The weighting factor β for the target assist torque $T_{m,mc}$ becomes 1 when P>1 and becomes P when 0≤P≤1. On the other hand, the weighting factor α for the target automatic steering torque ($sat_{Tmin,Tmax}(T_{m,ac})-T_{lem}$) becomes 0 when P>1 and becomes (1−P) when 0≤P≤1.

Therefore, when P>1, β=1 and α=0 and therefore $T_m = T_{m,mc}$. The steering based on the target assist torque $T_{m,mc}$ is thereby arranged to be performed when the absolute value $|T_d|$ of the steering torque increases. Steering by the manual steering is thereby performed.

When P<0, β=0 and α=1 and therefore $T_m = (sat_{Tmin,Tmax}(T_{m,ac})-T_{lem})$. The steering based on the target automatic steering torque ($sat_{Tmin,Tmax}(T_{m,ac})-T_{lem}$) is thereby arranged to be performed when the absolute value $|T_d|$ of the steering torque is zero.

When P is within the range of 0≤P≤1, a increases as P(=β) decreases. Therefore, a proportion of the target motor torque $T_m$ occupied by the target automatic steering torque ($sat_{Tmin,Tmax}(T_{m,ac})-T_{lem}$) increases as P decreases. Oppositely, a proportion of the target motor torque $T_m$ occupied by the target assist torque $T_{m,mc}$ increases as absolute value $|T_d|$ of the steering torque $T_d$ increases, that is, as P increases.

Therefore, if the driver is not performing a steering operation when P is within the range of 0≤P≤1, the absolute value $|T_d|$ of the steering torque $T_d$ and P are comparatively small and therefore, steering is mainly performed based on ($sat_{Tmin,Tmax}(T_{m,ac})-T_{lem}$). Steering by the automatic steering is thereby enabled.

If the driver performs a steering operation (steering intervention) when P is within the range of 0≤P≤1, the absolute value $|T_d|$ of the steering torque $T_d$ increases and therefore, steering is mainly performed based on the target assist torque $T_{m,mc}$. Steering by the manual steering is thereby enabled. Although |Δθ| increases and the absolute value $|T_{m,ac}|$ of the angle controlling target torque $T_{m,ac}$ increases in this process, it is possible to suppress increase of the steering reaction force during the steering intervention by the driver because the limiter 95 restricts the angle controlling target torque $T_{m,ac}$ set by the angle controller 42 and therefore, the driver is enabled to perform the steering intervention easily.

If the driver weakens the degree of the steering intervention while performing the steering intervention when P is within the range of 0≤P≤1, the absolute value $|T_d|$ of the steering torque $T_d$ changes from the state of being large to the state of being small. Therefore, P(=β) also changes from a state of being large to a state of being small and a changes from a state of being small to a state of being large. Thereby, based on the formula (10), the proportion of the target motor torque $T_m$ occupied by the target assist torque $T_{m,mc}$ decreases and the proportion of the target automatic steering torque ($sat_{Tmin,Tmax}(T_{m,ac})-T_{lem}$) increases in accordance with the degree of the steering intervention.

If the driver strengthens the degree of the steering intervention while performing the steering intervention, the respective changes occur in reverse directions. The driver is thus able to perform switching between the state in which the automatic steering is dominant and the state in which the steering by the driver is dominant seamlessly and smoothly by simply adjusting the degree of steering intervention and being unaware of the junction of the switching.

Also, the β calculating portion 93 may calculate the weighting factor β based on a saturation function $sat_{0,1}(Q_n)$ shown in the following formula (12). The saturation function $sat_{0,1}(Q_n)$ is calculated using the steering torque $T_d$, which is an example of the "value that changes in accordance with the driver input." Even in this case, the steering torque $T_d$ detected by the torque sensor 12 is input into the shared control portion 44 as indicated by the alternate long and two short dashed lines in FIG. 2 and FIG. 8.

$$\beta = sat_{0,1}(Q_n)$$

$$Q_n = Q_{n-1} + j1*(|T_{d(n)}| - |T_{th}|) \quad (12)$$

j1 (j1>0): factor for increasing/decreasing $Q_n$ $T_{th}$: predetermined threshold $$sat_{0,1}(Q_n) = \begin{cases} 1 & \text{IF } Q_n > 1 \\ Q_n & \text{IF } 0 \leq Q_n \leq 1 \\ 0 & \text{IF } Q_n < 0 \end{cases}$$

In the formula (12), $Q_n$ represents a present value of Q and $Q_{n-1}$ represents a previous value of Q. Also, $|T_{d(n)}|$ represents a present value of the absolute value of the steering torque $T_d$.

In the steering wheel released state ($T_d$=0), $Q_n$ decreases. In the steering wheel gripped state, $Q_n$ increases when the absolute value $|T_d|$ of the steering torque increases. Therefore, even in this case, the same actions and effects as in the case of calculating the weighting factor β, based on the formula (11) are obtained.

Also, with the preferred embodiment described above, the limiter 95 that restricts the angle controlling target torque $T_{m,ac}$ set by the angle controller 42 to be between the lower limit saturation value $T_{min}$ and the upper limit saturation value $T_{max}$ (see FIG. 8) is provided to enable the driver to release the automatic steering easily. However, a gain controller 66 that controls a feedback gain of the PD controller (see FIG. 4) may be provided in place of the limiter 95 as indicated by alternate long and two short dashed lines in FIG. 4.

In the present preferred embodiment, the gain controller 66 controls the proportional gain $K_P$ and the differential gain $K_D$ based on the value that changes in accordance with the driver input to suppress the absolute value of the angle controlling target torque $T_{m,ac}$ from becoming excessive during the steering intervention.

As the "value that changes in accordance with the driver input" that is used in the gain controller 66, for example, it is possible to use the angular deviation Δθ, the steering torque $T_d$, etc. However, the "value that changes in accordance with the driver input" that is used in the gain controller 66 is preferably a value that differs from the "value that changes in accordance with the driver input" that is used in the calculation of β.

Figure 11:
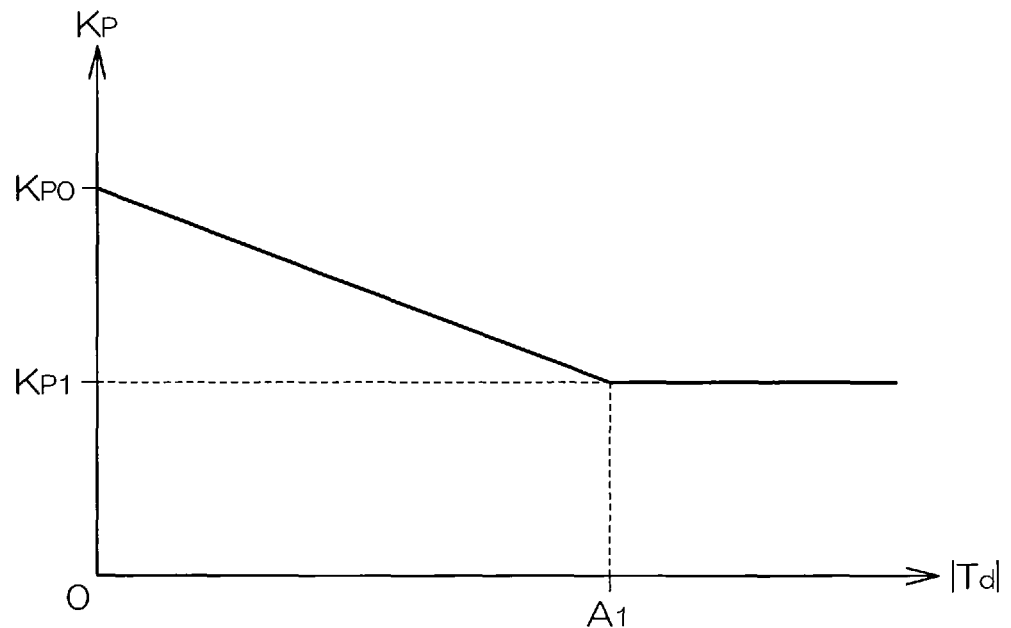
FIG. 11 is a graph of a setting example of a proportional gain $K_P$ with respect to a steering torque absolute value $|T_d|$.
Figure 12:
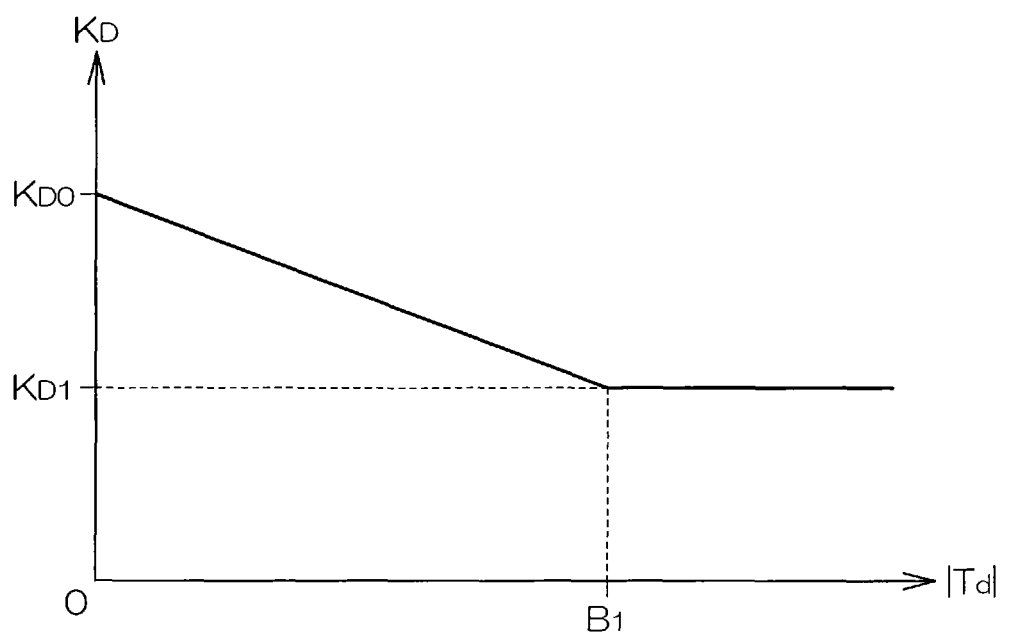
FIG. 12 is a graph of a setting example of a differential gain $K_D$ with respect to the steering torque absolute value $|T_d|$.

Setting examples of the proportional gain $K_P$ and the differential gain $K_D$ in cases where the "value that changes in accordance with the driver input" that is used in the gain controller 66 is the steering torque $T_d$ are respectively shown in FIG. 11 and FIG. 12.

Referring to FIG. 11, the proportional gain $K_P$ is set to a positive predetermined value $K_{P0}$ when the absolute value $|T_d|$ of the steering torque is 0. When the absolute value $|T_d|$ of the steering torque is in a range of not less than a predetermined value $A_1$ ($A_1>0$), the proportional gain $K_P$ is set to a positive predetermined value $K_{P1}$ that is less than $K_{P0}$. When the absolute value $|T_d|$ of the steering torque is in a range of not less than 0 to not more than $A_1$, the proportional gain $K_P$ is set in accordance with a characteristic of decreasing within a range from $K_{P0}$ to $K_{P1}$ as $|T_d|$ increases.

Referring to FIG. 12, the differential gain $K_D$ is set to a positive predetermined value $K_{D0}$ when the absolute value $|T_d|$ of the steering torque is 0. When the absolute value $|T_d|$ of the steering torque is in a range of not less than a predetermined value $B_1$ ($B_1>0$), the differential gain $K_D$ is set to a positive predetermined value $K_{D1}$ that is less than $K_{D0}$. When the absolute value $|T_d|$ of the steering torque is in a range of not less than 0 to not more than $B_1$, the differential gain $K_D$ is set in accordance with a characteristic of decreasing within a range from $K_{D0}$ to $K_{D1}$ as $|T_d|$ increases.

When the driver performs the steering intervention during the automatic steering, the absolute value of the angular deviation $\Delta\theta$ increases, the absolute value of the angle controlling target torque $T_{m,ac}$ increases, the steering reaction force increases, and it therefore becomes difficult for the driver to perform the steering intervention. However, as the absolute value of the steering torque $T_d$ increases due to the steering intervention, the proportional gain $K_P$ and the differential gain $K_D$ are decreased by the gain controller 66. Responsiveness of the angle controlling target torque $T_{m,ac}$ set by the angle controller 42 is thereby decreased and therefore, it is possible to suppress the absolute value of the angle controlling target torque $T_{m,ac}$ from becoming excessive.

Although with each of the setting examples of FIGS. 11 and 12, the absolute value of the steering torque $T_d$ was used for the abscissa, in cases where the steering torque $T_d$ is adopted as the "value that changes in accordance with the driver input," the saturation function $sat_{0,1}(P)$ defined by the formula (11) or the saturation function $sat_{0,1}(Q_n)$ defined by the formula (12), etc., may be used for the abscissa in each of FIGS. 11 and 12. Also, if the angular deviation $\Delta\theta$ is adopted as the "value that changes in accordance with the driver input," it is possible to use the absolute value of the angular deviation $\Delta\theta$, etc., for the abscissa of each of FIGS. 11 and 12.

Also, although with the preferred embodiment described above, the angle controller 42 includes the feedforward controller 63, the feedforward controller 63 may be omitted.

Also, although with the preferred embodiment described above, the compensation object load $T_{le}$ includes the road surface load torque $T_{rl}$ and the friction torque $T_f$, it may include just one of either instead.

Also, the compensation object load $T_{le}$ may include an inertia torque applied to the output shaft 9 by an inertial force of constituent members of the torque transmission path from the torsion bar 10 to the tires.

While preferred embodiments of the present invention have been described in detail above, these are merely specific examples used to clarify the technical content of the present invention, and the present invention should not be interpreted as being limited only to these specific examples, and the scope of the present invention shall be limited only by the appended claims.

The present application corresponds to Japanese Patent Application No. 2017-230561 filed on Nov. 30, 2017 in the Japan Patent Office, and the entire disclosure of this applications is incorporated herein by reference.

REFERENCE SIGNS LIST

1 . . . electric power steering device, 3 . . . turned wheel, 4 . . . turning mechanism, 18 . . . electric motor, 41 . . . assist controller, 42 . . . angle controller, 43 . . . compensation object load estimator, 44 . . . shared control portion, 61 . . . low-pass filter (LPF), 62 . . . feedback controller, 63 . . . feedforward controller, 64 . . . torque adder, 66 . . . gain controller, 201 . . . host ECU, 202 . . . motor controlling ECU

The invention claimed is:

1. A vehicle steering device comprising:
   an electric motor that applies a steering force to a turning mechanism of a vehicle;
   a microcomputer configured to:
      set a target assist torque in accordance with a steering torque;
      set an angle controlling target torque for reducing an angular deviation between a target steering angle and an actual steering angle;
      estimate a compensation object load with respect to the angle controlling target torque;
      calculate a target automatic steering torque based on the angle controlling target torque set by the microcomputer and the compensation object load estimated by the microcomputer; and
      perform weighted addition of the target automatic steering torque and the target assist torque in accordance with a value that changes in accordance with a driver input to calculate a target motor torque that is a target value of a motor torque of the electric motor; and
   a drive circuit configured to control the electric motor based on the target motor torque that is calculated by the microcomputer.

2. The vehicle steering device according to claim 1, wherein the compensation object load includes a road surface load torque that a drive object of the electric motor receives from a road surface.

3. The vehicle steering device according to claim 1, wherein a torsion bar is included in middle of a torque transmission path between a steering member and the turning mechanism and
   the compensation object load includes a friction torque that is generated in a torque transmission path from the torsion bar to a turned wheel.

4. The motor controller according to claim 1, wherein the value that changes in accordance with the driver input used by the microcomputer is the angular deviation or the steering torque.

5. The vehicle steering device according to claim 4, wherein the value that changes in accordance with the driver input used by the microcomputer is the angular deviation,
   the microcomputer is configured to calculate the target motor torque by adding a value resulting from multiplying the target automatic steering torque by a first weighting factor and a value resulting from multiplying the target assist torque by a second weighting factor,
   the first weighting factor is set to become 0 when an absolute value of the angular deviation is more than a predetermined value and to decrease gradually from 1 to 0 as the absolute value of the angular deviation increases from 0 when the absolute value of the angular deviation is not more than the predetermined value, and the second weighting factor is set to become 1 when the absolute value of the angular deviation is more than the predetermined value and to increase gradually from 0 to 1 as the absolute value of the angular deviation increases from 0 when the absolute value of the angular deviation is not more than the predetermined value.

6. The motor controller according to claim 1, wherein the microcomputer is further configured to:

perform a predetermined feedback calculation on the angular deviation to calculate a feedback control torque, multiply a second order derivative of the target steering angle by a moment of inertia of the vehicle steering device to calculate a feedforward control torque, and add the feedforward control torque to the feedback control torque to calculate the angle controlling target torque.

7. The vehicle steering device according to claim 1, wherein the microcomputer is further configured to:

restrict the angle controlling target torque set by the microcomputer to be between a predetermined upper limit value and a predetermined lower limit value and calculate the target automatic steering torque based on the angle controlling target torque after a restriction process by the microcomputer and the compensation object load estimated by the microcomputer.

\* \* \* \* \*